United States Patent [19]

Stockham, Jr.

[11] 4,202,018

[45] May 6, 1980

[54] APPARATUS AND METHOD FOR PROVIDING ERROR RECOGNITION AND CORRECTION OF RECORDED DIGITAL INFORMATION

[75] Inventor: Thomas G. Stockham, Jr., Salt Lake City, Utah

[73] Assignee: Soundstream, Inc., Salt Lake City, Utah

[21] Appl. No.: 946,067

[22] Filed: Sep. 27, 1978

[51] Int. Cl.² .............................................. G11B 5/09
[52] U.S. Cl. ..................................... 360/47; 360/53
[58] Field of Search ........................... 360/32, 53, 47; 340/146.1 BA, 146.1 BE, 146.1 F

[56] References Cited

U.S. PATENT DOCUMENTS

| 3,142,829 | 7/1964 | Comstock | 360/53 |
| 3,320,598 | 5/1967 | Star | 360/47 |
| 3,883,891 | 3/1975 | Thompson et al. | 360/47 |

*Primary Examiner*—Vincent P. Canney
*Attorney, Agent, or Firm*—M. Reid Russell

[57] ABSTRACT

The present invention involves apparatus and techniques for converting analog data, preferably audio signals, to digital information, which digital information is preferably recorded from two separate main channels onto main tracks and includes a third or backup track for recording thereon partial or most significant portions of that information recorded on the main tracks. The invention involves apparatus and techniques of each data group on each main track and the backup track; checking for synchronization codes arranged between data groups; and checking for a match of that appropriate portion of the main track data against the data on the backup track, with, when potentially erroneous or questionable data is detected, the invention providing for comparison of main and backup track data groupings for determining which is most likely correct or, in the case where neither data grouping is identifiable as most likely correct, the invention provides for substitution of last correct data or integration between good data. The preferred invention incorporates clocking at the signal input for data stablization, and first-in-first-out circuitry at the output for reducing the effects of wow and flutter to produce a very high quality conversion of digital to analog form to pass to a speaker system.

15 Claims, 7 Drawing Figures

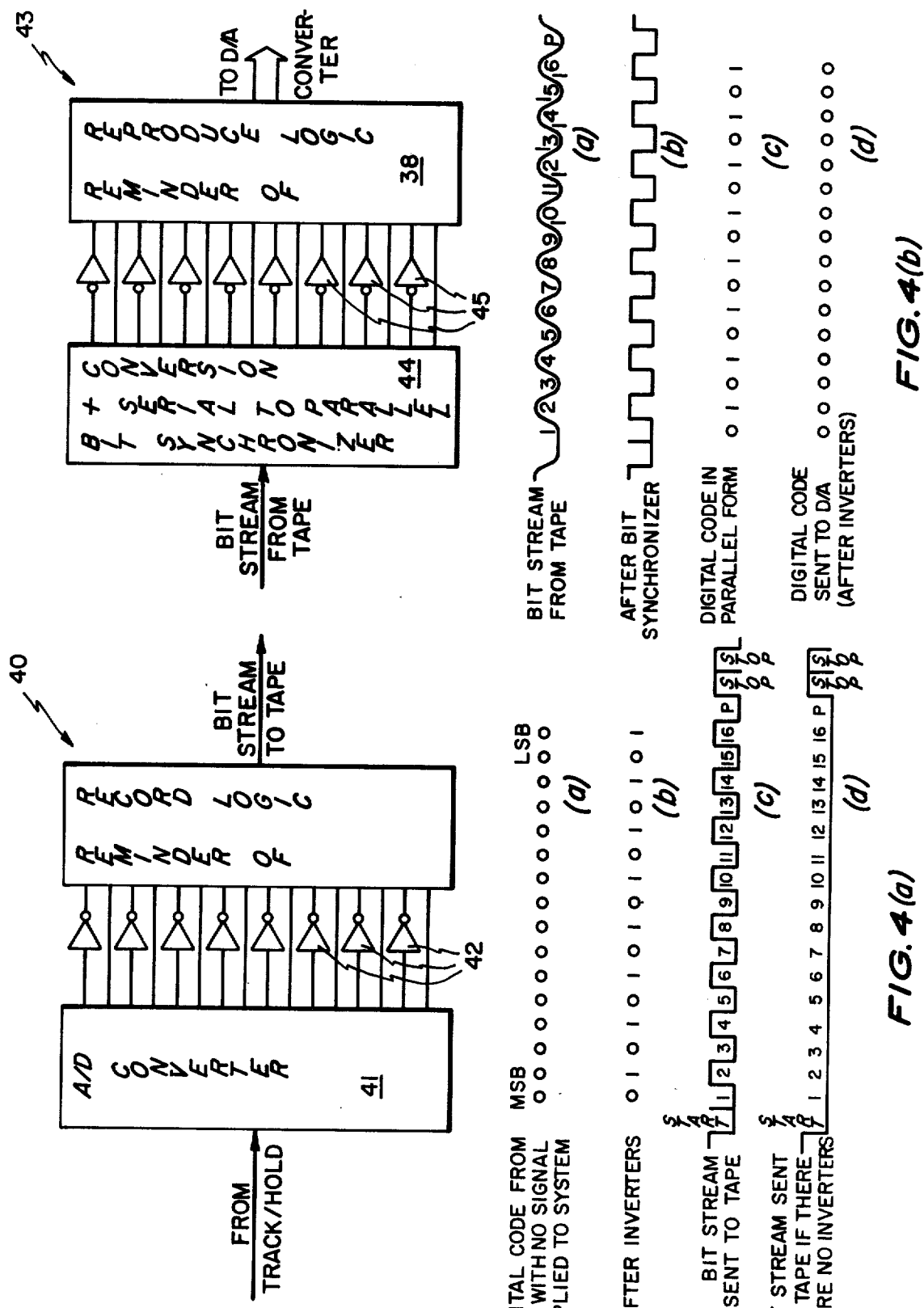

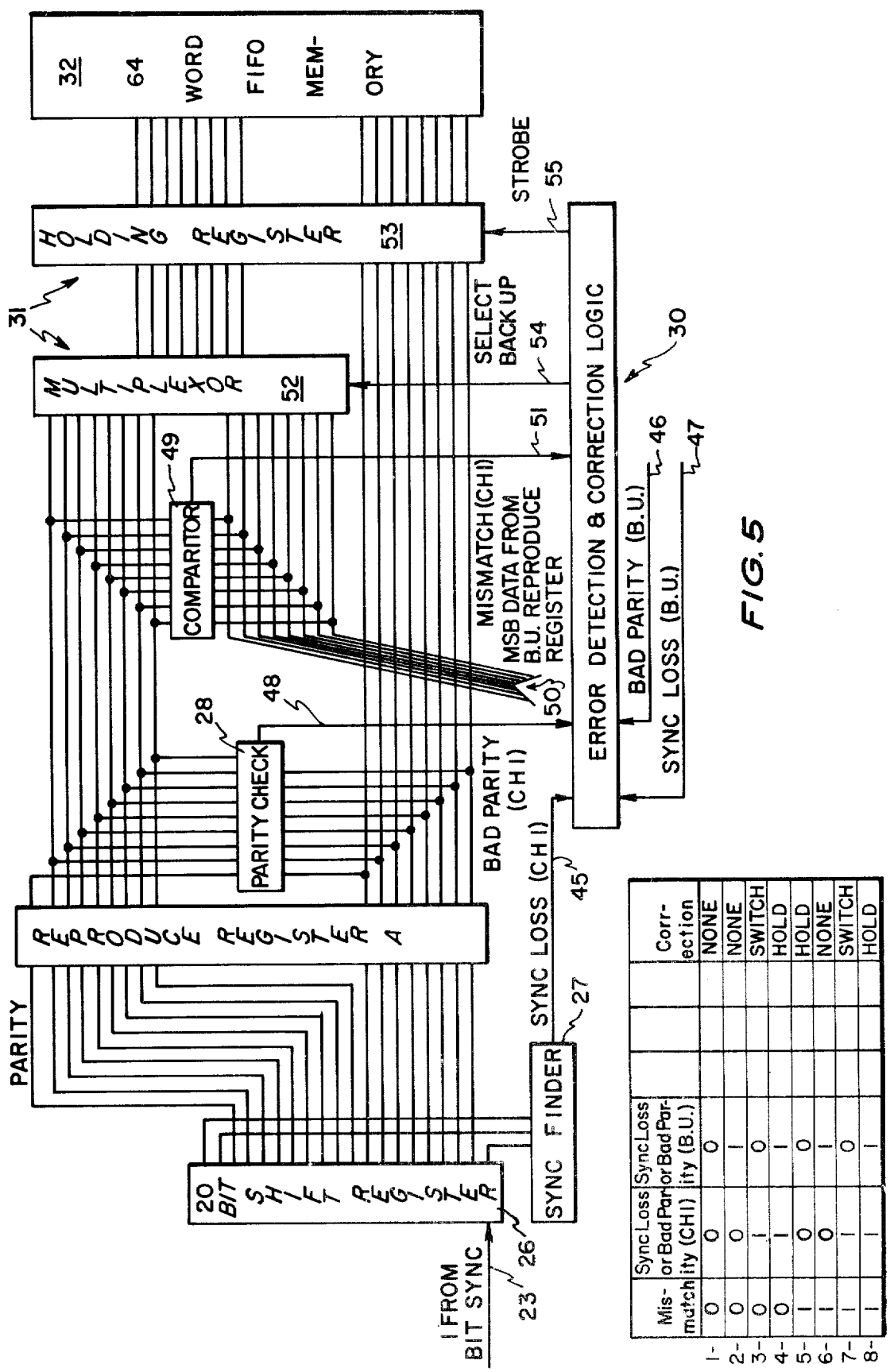

APPARATUS AND METHOD FOR PROVIDING ERROR RECOGNITION AND CORRECTION OF RECORDED DIGITAL INFORMATION

BRIEF DESCRIPTION OF THE INVENTION

1. Field of the Invention

This invention relates to apparatus for conversion of analog information, preferably audio, to digital form and methods for error recognition and correction of digital data groups representing that information.

2. Background of the Invention

Techniques for converting analog data to digital form are increasingly being utilized in new areas of information recording. This is due in part to the ease of manipulation of digital data and the simplicity of its recording, transmission and storage. By recording analog information into a digital domain, certain problems commonly encountered in recording audio signals in analog form onto a record or tape medium either have little or no effect on the quality of a finished recording, or can be partially to totally eliminated. Analog recording has traditionally been burdened by a number of problems relating to the functioning of the medium, such as the quality of magnetic tape and tape moving mechanisms, which problems, by employing digital recording techniques, may be eliminated or minimized. Some examples of such problems include: (1) inadequate dynamic range, where there is a low signal-to-noise ration; (2) phase distortion; (3) harmonic distortion; (4) insufficient transient response; (5) modulation noise; (6) crosstalk; (7) print through; (8) multicopy degredation; (9) wow and flutter; (10) inherent limitations in noise reduction systems; (11) storage degredation with time; and, (12) limited low-end frequency response. Digital recording techniques have been found to provide for either an improvement in or total elimination of distortion resulting from each of the above problems. The utilization of a digital form provides for the elimination of certain of the problems as they exist in the analog domain only. The effects of the other listed problems on a finished recording can either be greatly reduced or totally eliminated with a digital medium is utilized, providing an increased facility for handling an audio signal when it is converted to digital form. Of the twelve example problems listed above that are all associated with standard analog recording, five, including: (5) modulation noise: (7) print-through; (9) wow and flutter; (10) inherent limitations in noise reduction systems; and (12) limited low-end frequency response, can be totally eliminated. Four problems, to include: (2) phase distortion; (3) harmonic distortion; (4) insufficient transient response; and (6) cross-talk can be reduced to inaudibility, and the other three problems: (1) inadequate dynamic range; (8) multicopy degredation; and (11) storage degredation, can be significantly improved.

As outlined hereinabove, conversion of analog information, preferably audio, into a digital form greatly simplifies recording of that data on a permanent medium providing an improved quality of recording. The present invention recognizes the capabilities of utilizing a digital format for sound reproduction and recording, and additionally seeks to eliminate or minimize errors that occur with such digital reproduction of audio information to produce the highest quality of sound reproduction possible. Briefly, such errors include errors developed in a series of bits in a data grouping where certain numbers of those bits may not successfully be decoded because the audio level of the signal being recorded remains essentially constant over a time period. Other problems associated with recording on a tape medium may include tape defects, such as thickness differences that would cause "drop outs" of information. Further, defects in the recording apparatus, such as problems with the recording head, its spacing from a medium, or the like, can result in recording problems. The present invention, as will be shown herein, provides techniques for eliminating or minimizing the chance for the occurrence of such errors, and, when such errors are found in primary data recorded on main tracks, provides for correction of such errors, by substitution of data from a backup track, or, if necessary, provides for integration between good data groups, producing thereby a high quality reproduction of a recorded audio performance.

PRIOR ART

As outlined hereinabove, there are many advantages to reproducing audio information into a digital form. The advantages include a higher quality or truer reproduction of that audio information than was heretofore possible. The present invention provides improved methods and apparatus for recording audio analoginformation into digital form and for detecting and correcting errors in that recorded information to provide a high quality sound reproduction.

The present invention utilizes clocking to make possible the recording of data on separate tracks, such clocking providing for switching from one track to another upon a signal loss in one track. An example of such clocking that the present invention improves upon that involves non-return-to-zero recording with a use of a parity bit, is shown in U.S. Pat. No. 3,237,176.

An example of a device that is somewhat like the present invention in that it utilizes non-return-to-zero recoding as preferably does the present invention, is shown in U.S. Pat. No. 3,414,894. This device, similar to the present invention, incorporates timing pulsing to provide a delay to allow for comparison of information between tracks. Clock pulsing for separating primary and secondary data similar to that utilized in the present invention is shown in a number of prior art arrangements whereby a precise time base control is achieved to allow for higher density operation, with clock pulsing marking boundaries therebetween. Further, U.S. Pat. No. 3,761,903, similar to the present invention, shows an arrangement whereby, upon detection of an error while reading from one track, it is possible to switch to re-read the same item of information from another track.

Some of the above cited prior art arrangements show examples of dual track recording of data on a magnetic medium of groupings of data bits, some like the present invention, also involving parity coding for data grouping separation within signal trains. Additionally, U.S. Pat. No. 3,665,430 involves insertion of a synchronizing code between data groupings, on parallel tracks for separating those groupings. Similar to these prior devices, the present invention involves elements for checking for both parity and synchronizing code errors to determine the validity of information contained in each data grouping and provides for switching between tracks upon detection of an error.

Prior art devices like those cited above, have generally involved one or, at most, two error checking techniques, including parity checking, checking synchronization coding, and comparison of information on primary and secondary tracks. None, however, within the knowledge of the inventor, prior to the present invention, employs together the above listed three error detection techniques. Therefore, the present invention is believed to be a significant improvement over earlier apparatus and techniques for error detection of high density digital recording.

The present invention preferably involves a two channel unit recording data on two main trcks and includes a single backup track though it is, of course, adaptable for single channel or more than two channel recording. With such two main channel recording it would be difficult to reproduce all the data from two main tracks on the single backup track, and therefore the present invention also involves selection of most significant data from each main track for reproduction on the backup track. Such selected data is the most significant data and is for substitution for the main track data when an appropriate error is detected. Further, where a determination cannot be made as to which of the data on a main or backup track is good data, the present invention provides for an interpolation between good data on either side of that questionable data.

Additionally, it is well known that one of the inherent problems in accurate data reproduction in digital sound recording occurs because of base line fluctuation problems encountered in non-return-to-zero recording. The present invention solves this problem by altering every other bit in each data group to create switching, facilitating pickup thereof and decoding. Apparatus and techniques for providing such desirable switching within the knowledge of the inventor, has not heretofore been in use.

Within the knowledge of the inventor, there has not heretofore existed an apparatus like that of the present invention, nor have the error detection and correction techniques of the present invention been used heretofore.

SUMMARY OF THE INVENTION

It is the principal object of the present invention to provide apparatus and techniques for converting and recording of analog information in digital form, recording primary information and select most significant information therefrom recorded separately, the invention providing techniques for detection of errors or unreliable information in individual data groups of primary and backup information with, upon a detection of an error, selecting for further processing the most likely correct data and, where such determination cannot be made, the invention providing for an averaging or integration between good data.

Another object of the present invention is to provide for recording of data groupings such that the polarity of every other bit in each data grouping is reversed for eliminating run errors attributable to small changes in audio signal level that occur over a number of data groups.

Still another object of the present invention is to provide for insertion and checking for, in each data grouping, parity and synchronization coding, and to provide for checking for an information match between appropriate main and backup information, the invention having a capability of storing sufficient data groupings for processing main and backup information, selecting very like correct data, or providing for an integration between good data, insuring thereby an accurate reproduction.

The principal features of the present invention include recording apparatus for conversion of analog signals to digital form for permanent recording on an appropriate medium. The invention preferably provides for producing data groupings representative of an amplitude point in an audio recorder signal and preferably recording that data onto main tracks with most significant information therefrom recorded on a backup track. The invention also preferably includes a memory arrangement for storing a limited number of such data groupings for error detection and correction purposes, utilizing non-return-to-zero (NRZ) level coding of information. Each data group preferably consists of 16 bits per group, though of course, any appropriate number of data bits could be so used and is augmented, preferably, with a single odd parity bit, as an error detection device. A synchronization coding, preferably a 3-bit code of one, one, zero (1,1,0) is also preferably included appropriately with each data grouping, though of course, a 0,1,1, or the like, could be so arranged in an individual or in a number of data groupings as desired. While 16 bits per word is preferred to make up the information of a data grouping, it should be obvious that other appropriate numbers of bits could be so employed.

The present invention avoids well known base line fluctuation problems encountered when recording NRZ codes on magnetic tape by alternating every other bit in each bit group, complementing it on its writing and complementing it again as it is read from the tape. The effect of complementing each alternate bit is to provide switching between strings of ones or zeros, especially as when the signals are of small amplitude. This approach to correction of base line fluctuation problems is preferred as it is both simple to implement and offers the most efficient use of tape spacing per bit in the digital data stream.

The present invention, as mentioned hereinabove, involves a synchronization of data groups by inclusion of a three bit synchronization code, which coding is checked as part of the error detection system of the present invention. Additional to checking for the presence of that synchronization code in the information on the main and backup tracks, the present invention also involves checking for the parity bit therein. The present invention therefore involves checking parity and synchronization coding information and, where such information is not present, this condition is reflected as an error and correction techniques described later herein are employed.

Additional error detection circuitry and tehcniques for its use that are employed by the present invention involve matching or comparison of data recorded on the main track with like data recorded on a backup track. Should a difference be detected between that main and backup track data, then the present invention provides for a selection of which data is most likely correct. Such determination takes into account the presence or absence of the redundant information in the data, specifically the condition of the parity bits and/or bit synchronization codes. Should that data on one track not contain synchronization code and/or not contain the appropriate parity bit, then the other track could be assumed to contain correct information. Should both the bit synchronization code and the parity bit for a particular grouping be present on both main and backup tracks and yet an error or difference exist between the information on those tracks then the present invention provides for an integration between good data on either side of that questionable data.

The present invention preferably involves recording information from two channels onto two main tracks with a backup track for recording most significant data from that on each of the main tracks. The present inventor has determined that the first half of the bits of a single data grouping, shown herein as the first 8 bits of a 16 bit word, is most significant. Of course, that data word could be composed of more or less than 16 bits as would be appropriate to the information to be represented or the apparatus used. The backup track would thereby hold the most significant information from both main tracks. Additionally, the data recorded on the backup track preferably also includes the same arrangement of parity and synchronization coding as on the main tracks for use, as described above, in the error detection/correction process.

The present invention, by an employment of the three error detection/correction techniques described hereinabove, generally defines what is most probably correct data. Passage of that most likely correct data from a main track or a substitution of data from the backup track for that main track then takes place which substitution of backup track data is added to the retained least significant portion of the data group on the main track, yielding minimally disruptive distortion.

The present invention, while it is not in itself a computer, can be interfaced with a general purpose digital computer, permitting the transfer of original audio recordings to the computer for editing and back to the recorder for remote playback of the edited versions. So arranged the recorder is interfacable, in a direct digital mode, with digital editors, mixing systems, equalizers, and other digital processing equipment both at the input and output. The recorder apparatus of the present invention provides a crystal clock for synchronizing playback in the preferred two channel system, and preferably involving also a digital memory buffer for comparing between a limited number of data groupings checking for match errors. Crystal clocking minimizes the effects of a tape skew or head scatter, with the digital memory being used to remove variations caused by playback tape speed inconsistancies when used with a tape drive servo.

DRAWINGS

FIG. 1, is a block schematic diagram of a preferred two-channel digital tape recorder of the present invention showing inputs and circuitry associated with recording onto a tape;

FIG. 1(a), a continuation of the two-channel digital tape recorder of FIG. 1, showing the signal flow and error detection/correction circuitry of the present invention;

FIG. 2, a line and block flow schematic showing a 16 bit data word flow of both main and backup tracks, showing the signal flow for performing error detection and correction functions upon such error detection;

FIG. 3, line representations of the different signals generated within the two-channel digital recorder of FIG. 1 and 1(a), where the audio analog signal is encoded into digital form with a conversion of that signal back from digital to analog;

FIG. 4(a), circuitry for inverting every other bit in a serial stream;

FIG. 4(b), shows circuitry for converting an inverted serial stream back to its original configuration when the stream is taken off from the tape; and FIG. 5, shows a line block schematic of an error detection and correction scheme of the present invention that is generated by the apparatus of the two-channel digital recorder of FIGS. 1 and 1(a).

DETAILED DESCRIPTION

Figure 1:
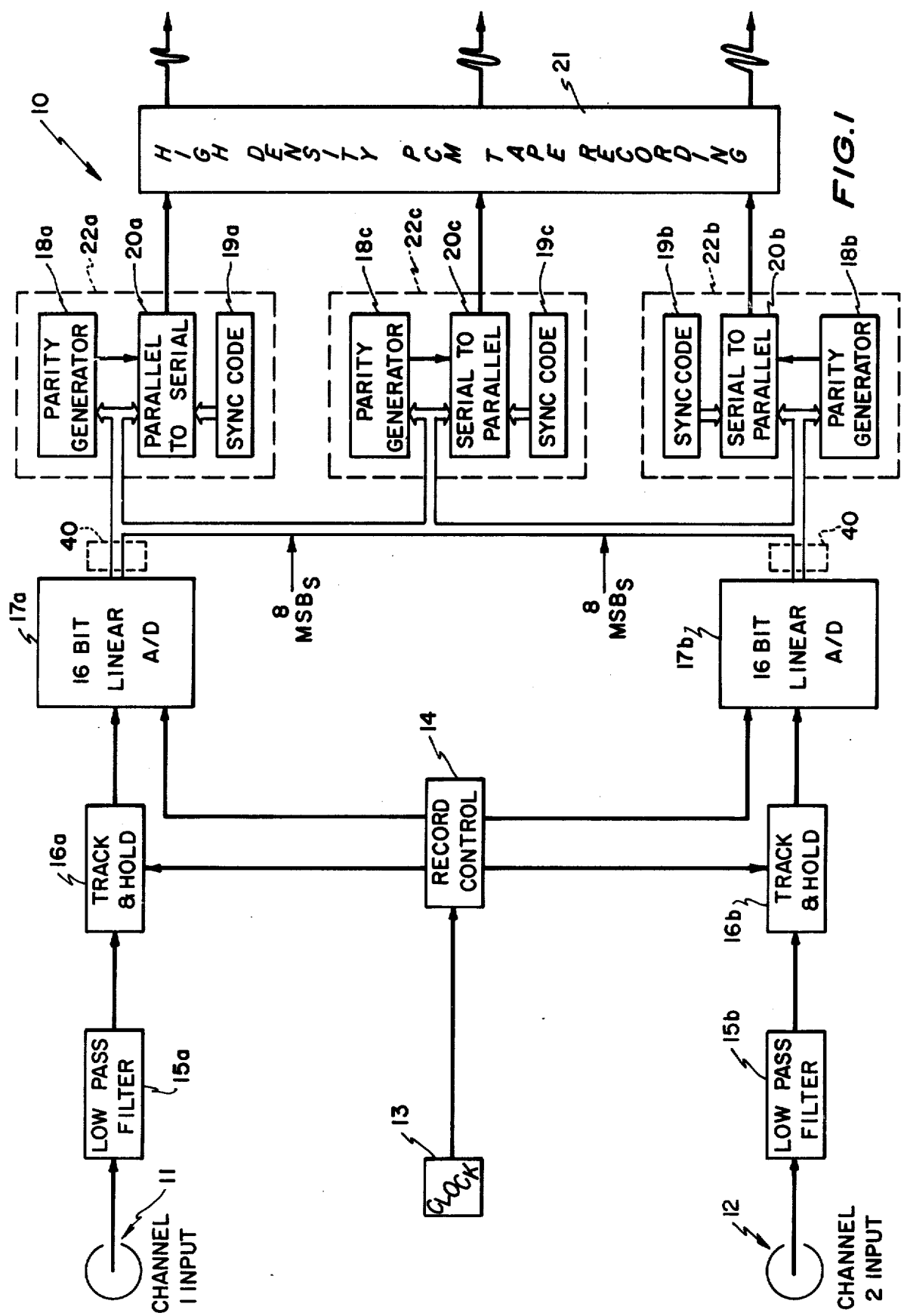
Figure 1A:
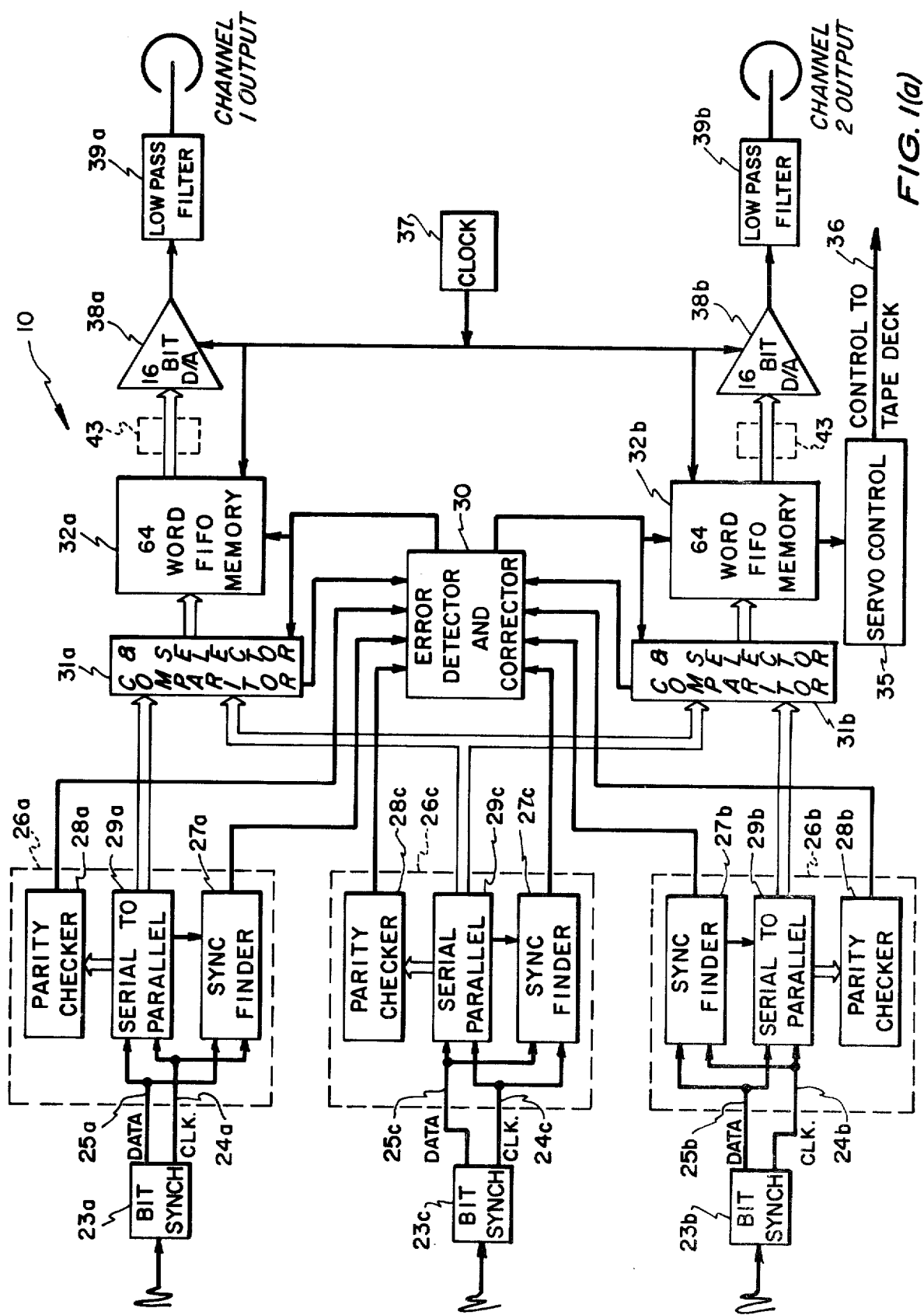

Referring now to the drawings:

Shown in FIGS. 1 and 1(a) are block schematic diagram views of a preferred embodiment of a two-channel digital tape recorder 10 that preferably involves non-return-to-zero (NRZ) recording, though, of course, it could employ other recording techniques, hereinafter referred to as recorder. FIGS. 1 and 1(a) should be taken as being read from left to right with inputs from first and second channels entering, as a stereo performance, at main track inputs 11 and 12. Shown in FIGS. 1 and 1(a), the recorder 10 preferably involves a clock 13 that feeds pulses, as shown in line (a) in FIG. 3, into a record control 14, to synchronize the main track inputs after their passage through lowpass filters 15a and 15b. While main and backup tracks are called for herein, it should be understood that the data could be recorded on any appropriate media in any appropriate flow without departing from the subject matter coming within the scope of this disclosure. Low-pass filters 15a and 15b mentioned hereinabove are provided to filter out frequencies above a so-called Nyquist frequency to prevent aliasing in the sample and hold analog to digital conversion. From the record control the signal from clock 13 is imposed upon the signals entering track and hold circuits 16a and 16b, the record control 14 also passing a timing pulse, shown at line (b) in FIG. 3, to circuitry 17a and 17b as identified as 16 bit linear analog to digital converter (A/D). The 16 bits, of course, assume a 16 bit data word. While such 16 bit data word is preferred, it should be obvious that any appropriate number of bits could be so employed. Therefore, if more or less than 16 bits per data word are so employed then circuitry 17a and 17b would be modified appropriately.

Figure 3:
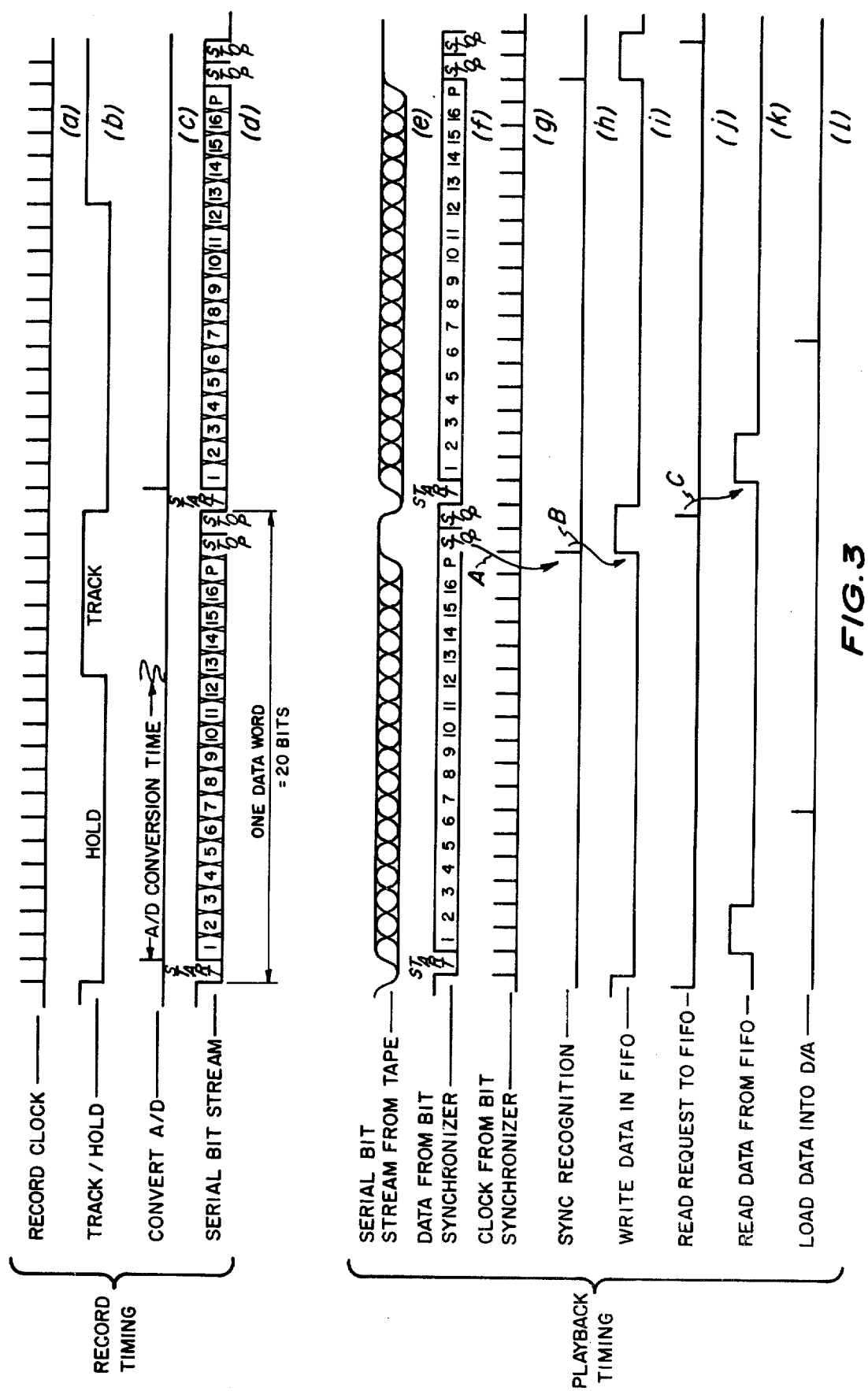

At circuitry 17a and 17b the audio analog signal, as timed by a pulse shown at line (c) of FIG. 3, is converted to digital form, preferably the 16 bit data word. That data word is fed at intervals to circuitry for adding a parity bit and synchronization code bits, forming thereby a 20 bit word output, which word is represented by a line (d) in FIG. 3. Shown in FIG. 1, the parity bit is inserted into each 16 bit word by parity generators 18a and 18b that are shown in the main tracks and a parity bit generator 18c that is connected so as to also insert a parity bit in each data word in a backup track, the function of which backup track will be explained in detail later herein. The above mentioned synchronization code is entered into the main track data flow by circuitry identified as sync code 19a and 19b. Synchronization coding is also added to the data word in the backup track by circuitry shown as sync code 19c. The preferred synchronization code preferably consists of a start bit inserted prior to the 16 data bits with two stop bits inserted after the parity bit at the end of the word as illustrated by line (d) of FIG. 3 though, of course, any arrangement of synchronization bit coding and appropriate number of bits therefore could be so used, the arrangement of the present invention being shown for illustration only.

The data word with parity and synchronization codes inserted in the main and backup tracks, as described hereinabove, are assembled in circuitry identified as a parallel to serial block 20a, 20b, and 20c, to travel therefrom and be recorded as a high density recording by an appropriate recorder, which recording is made preferably on a high density tape 21 in FIG. 1, hereinafter referred to as tape, though, of course, any other appropriate medium could be so used.

As stated above, the present invention preferably involves two main tracks and a single backup track. The backup track, as shown best in FIG. 2, preferably receives, for recording on tape 21 a reproduction of the first 8 bits of each of the 16 bit data words from each of the primary tracks, that are identified as MSB, meaning most significant bits, backup track data thereby also totaling a 16 bit data word. The 16 bit data word on that backup track receives, as mentioned hereinabove, the described parity and synchronization code data bits therewith. The present invention provides for recording of the first 8 bits of each 16 bit data word as they are the most significant data of that word. Specifically, the first 8 bits of each 16 bit word are accurate to one part in 256, with a full 16 bit word reproduction being accurate to one part in 65,536. Reproduction of such first 8 bits for a 16 bit word, as for substitution of backup track data for primary track data, while not a complete reproduction, is sufficiently accurate so as not to introduce unacceptable distortion in a reproduction of an audio performance.

It should be noted that, while the present invention utilizes a 16 bit data word reflective of an amplitude point in an analog signal with intervals therebetween of equal length to the sample length, a different number of data bits representing that point of amplitude or a different distance therebetween could be so employed without departing from the subject matter coming from the scope of the present disclosure. It should be understood that the recorder 10 of the present invention preferably operates at 37.5 kilohertz, and provides for a satisfactory data reproduction for an audio band width of 15 kilohertz though, of course, other band widths could be used depending upon needs of the system.

Figure 2:
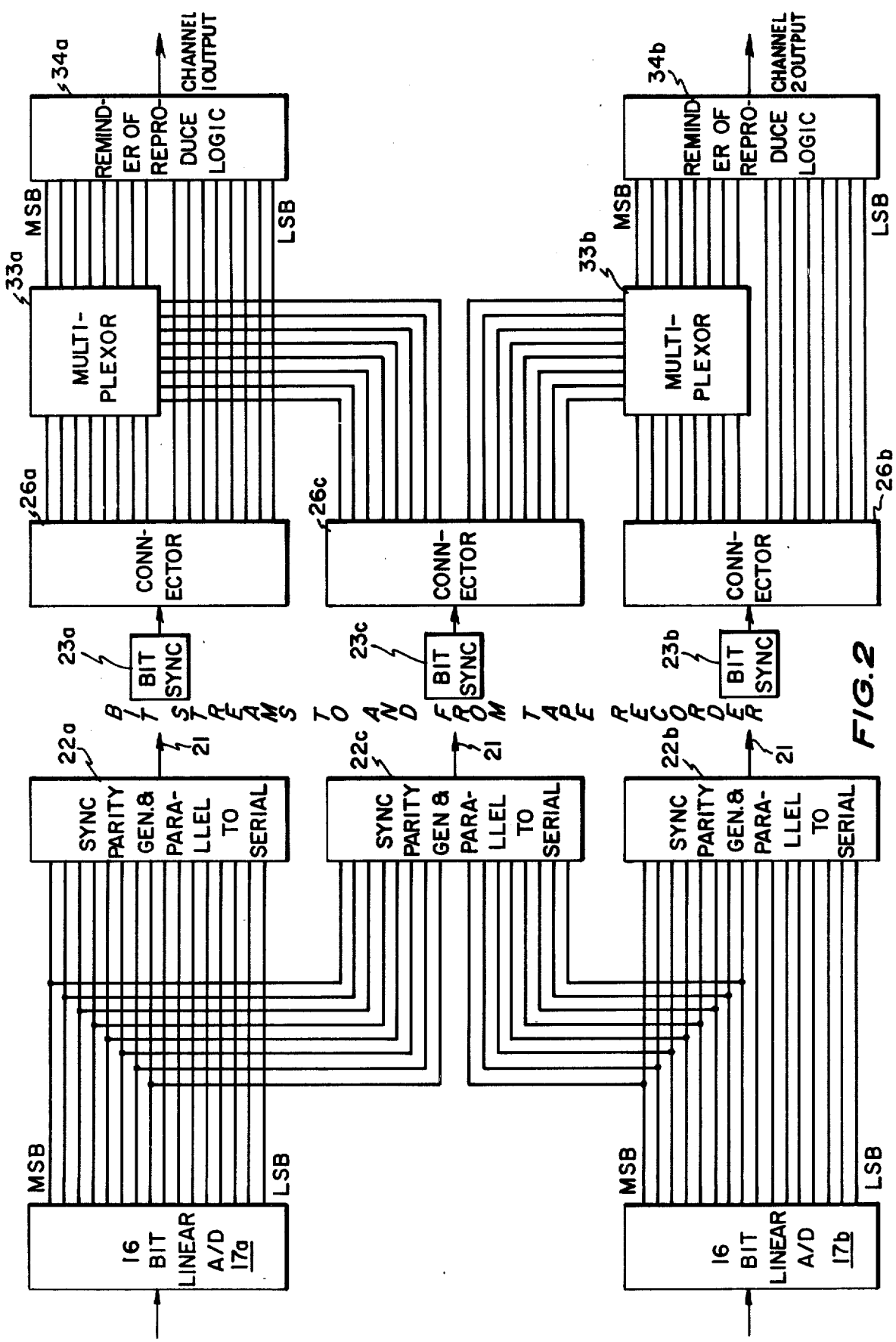

The line diagram shown in FIG. 2 represents circuitry whrerethrough analog signals are converged into the described groups of 16 bit digital data words, the first 8 bits of each data word on each main track being copied onto the backup track, with separate synchronization and parity coding encoded thereto, and the stream is converted from parallel to serial. This flow is shown as lines leading from 16 bit linear A/D 17a and 17b. The flow therefrom travels into blocks 22a, 22b and 22c that should be understood to contain the parity generator 18a, 18b and 18c, sync code 19a, 19b and 19c, and parallel to serial 20a, 20b and 20c circuitry described hereinabove. The main and backup information flow passed from blocks 22a, 22b and 22c is recorded on tape 21.

The recorder 10 in FIG. 1(a) is shown as being in a playback mode with the data words, described above, being picked up off the tape 21 that is shown in FIG. 1 and as an arrow in FIG. 2. Those data words picked up off of the tape travel on main and backup tracks passing to bit synchronizer circuitry 23a, 23b and 23c, respectively, as three separate streams that are band limited and have signal-to-noise ratios limited by the tape recorder electronics and tape. At the bit synchronization circuitry the streams are turned back into logical ones and zeros compatible with logic circuitry, which flow is shown at line (f) in FIG. 3. Bit synchronizer 23a, 23b and 23c determine bit intervals and generates a clock signal into the streams, as shown at line (g) in FIG. 3, represented as lines 24a, 24b and 24c, respectively. The clock signal is synchronized with the data signal output from that bit synchronizer, shown as line 25a, 25b and 25c, respectively, for the main and backup tracks.

Shown in FIG. 1(a), the data stream and clock signal for each track enters clock signal converters 26a, 26b and 26c, respectively, shown as broken lines in FIG. 1(a) and solid lines in FIG. 2. Therein, the bits in the serial stream are shifted from a serial form to parallel form at serial to parallel circuitry 29a, 29b and 29c, passing also through the sync finder 27a, 27b and 27c. The sync finder locates the synchronization bits in each data word that, as described hereinabove, preferably consist of a start bit at the front of the word and two stop bits at the end of the word. Each time that synchronization code is located, the data word is passed to a register as being a good data word. Simultaneously, parity checker 28a, 28b and 28c, respectively for each track, determine if the parity is good in that data word. Therefrom, the data flow passes to an error detection/correction circuitry portion of the present invention described hereinbelow. In FIG. 3, arrows A, B and C show the synchronization code being identified as trigger commands to operate that error detection/correction circuitry, and commands pass therefrom.

The error detection/correction logic of the present invention will be described in more detail later herein with respect to FIG. 5 but briefly involves, as shown in FIG. 1(a), circuitry consisting of a block entitled error detection and correction 30 that is arranged to control the passage of each data word in each track, receiving parity and synchronization data from blocks and an analysis of data match between main and backup track information from the comparator selector circuitry 31a and 31b. The error detection/correction circuitry analyzes that data then commands operations of circuits to pass the main track data as received or the main track last 8 bits with the first 8 most significant bits from the backup track, as will be explained with respect to FIG. 5. The data word as received or corrected in the comparator selector circuitry is passed for further processing in a 64 word FIFO (first-in-first-out) memory 32a and 32b, whose operation is commanded by the error detection/correction 30 as illustrated by the pulse at line (i) in FIG. 3. While a 64 word memory as shown herein is preferred, obviously circuitry employing greater or lesser memory could be so employed without departing from the subject matter of this disclosure.

It should be noted that, as shown in FIG. 2, the comparator selector circuit 31a and 31b and the error detection/correction circuitry 30 are identified as multiplexor circuitry 33a and 33b, that circuitry for passing therethrough the most reliable data word to the remainder to the channel outputs in FIG. 1(a) of reproduction logic circuitry identified at 34a and 34b, whose function will be explained hereinbelow wirh reference to FIG. 1(a).

Preferably, as shown in FIG. 1(a), the 64 word FIFO memory 32a is connected to a servo control 35 that provides control signals to a tape deck's speed circuitry, not shown. Such servo control circuitry is preferably standard, and is identified herein only as an arrow 36. Shown in FIG. 1(a), the 64 word FIFO memory 32a and 32b are each connected to clock 37 that should be understood to generate signals like that shown at lines (i), (j) and (k) in FIG. 3, commanding of writing into and reading from data words therein. Such clock signal passes also to 16 bit digital to analog converter circuitry 38a and 38b for synchronizing data outputs therefrom, that data synchronization being commanded by a signal like that shown at line (l) in FIG. 3. The data word signal passed from the converter circuitry 38a and 38b travels preferably through low-pass filters 39a and 39b. They function like the described low-pass filters 15a and 15b to remove all frequencies above the so-called Nyquist frequency. The output therefrom travels to the stereo output channels 1 and 2 for playback.

It should be noted that 64 word FIFO memory 38a and 38b is provided to insure that data coming in one end goes out the other end in the same order that it came in. The purpose thereof is to remove the effects of wow and flutter in the tape mechanism, to synchronize the output, and to provide a steady state output therefrom. This is essentially where the servo control 35 to tape deck 36, as described herein above, comes in to synchronize that data stream output. It should also be noted that clock 37, as described herein with respect to FIG. 1(a), controls the rate at which data stream processing takes place, as that rate is not necessarily equivalent to a crystal controlled oscillator rate. The 64 word FIFO memory 38a and 38b will therefore accept data words passed therefrom under the control of a crystal oscillator that connects to the servo control as described above, but is not shown. FIFO memory therefore has a varying number of words in it, that number being dependent upon whether the tape is slowed down or sped up appropriately. As the FIFO memory empties, that condition is sensed and the tape is sped up so that more bits will come off of the tape and the memory will fill up again, providing thereby a self controlled feed-back system.

In recording an audio signal, such as a musical performance, it is often the case that over certain periods of time the signal being recorded may not change markedly. Therefore, during such period, that signal as it is being converted to a digital format would remain at a very near zero voltage, with the digital representation thereof being a string of zeros or a partial patter of voltages of the same amplitude. The described bit synchronizer 23a, 23b and 23c relies on bit transition or voltage value changes to determine where bit intervals begin and end. Therefore, absent such voltage changes, differentiating bits is difficult. Such difficulties result in a greater likelihood of error. It has been found in practice that the greater the number of transitions between bits, the more accurately the bit period can be defined, and therefore the fewer errors. The present invention recognizes this condition and provides circuitry and data bit representations, as shown best in FIG. 4(a) and FIG. 4(b), for inverting every other bit in a bit stream. Therein, the bit stream is shown entering at (a) in FIG. 4(a) made up of all zeros, indicative of a constant sound. After passage through an invertor 40, the signal is, as shown in line (b). Thereafter, that signal is reformed into a square wave, as shown in line (c), for recording onto tape. Line (d) shownes how that bit stream would appear if the inverters 40 were not present.

In FIG. 4(a), each inverter 40 is shown to includean analog to digital converter 41, with a signal therefrom passing through appropriate inverters 42 wherein the voltage of every other bit in the data stream is inverted. Therefrom, the inverted signal is passed to the balance of circuitry shown in FIG. 1. In FIG. 1, broken lines 40 show that the inverters of FIG. 4(a) are optional inclusions therewith after the 16 bit linear A/D 17a and 17b.

Shown in FIG. 4(b), are inverters 43, that are also shown in broken lines in FIG. 1(a) arranged after the 64 word FIFO memory 32a and 32b and should be understood to be, along with inverters 40, an optional inclusion. Inverters 43 receive the bit stream coming off from the tape going through circuitry 44 wherein it is checked for errors, with most reliable information being passed therefrom, as described hereinabove. That signal enters inverters 45, as shown at line (a), with the signal, after bit synchronization, shown at line (b). This signal, in digitally coded parallel form, is shown in line (c), and line (d) shows the signal as it would appear after it has then passed through inverters 45. Inverters 45 would operate like the described inverters 42 to reverse the polarity of every other bit, converting that digital code back to the signal as it originally entered the system. Therefore, the signal passes through the 16 bit D/A converter 38a and 38b, shown in FIG. 1, and shown in FIG. 4(b) as 38. Therefrom, the signal passes through a standard playback portion of the recorder, now shown.

The inverter circuitry, shown in FIG. 4(a) and 4(b), is, of course, optional and is provided only to limit errors that generate in recording long strings of unchanging voltages as when recording an unchanging audio signal. This is particularly true when the analog to digital conversion is putting out codes that are at or near zero, as is most frequently encountered in sound recording.

In FIG. 5 is shown in block schematic a preferred error detection/correction logic diagram that should be taken as being representative of error detection/correction circuitry already shown and described with respect to FIG. 1, excepting that only a single main track is completely shown, with signals from a backup track shown entering therein. The circuitry of FIG. 1(a) heretofore identified as having sub-letters a, b, or c for the two main and single backup tracks, respectively, are therefore shown therein as the number alone. As an example, the left hand side of FIG. 5 shows bits synchronizer circuitry as an arrow identified as 23, that should be taken as being the bit synchronizers 23a, 23b and 23c, of FIG. 1(a).

It should be noted that the diagram of FIG. 5 proceeds from left to right with the data word from the bit synchronizers passed to bit shift register 26 where it is checked by circuitry identified as sync finder 27. The sync finder 27 looks for the synchronizer code arranged at the beginning and end of the 20 bit data word, as shown at line (d) in FIG. 3. The 20 bit data word, of course, also includes a parity bit, the checking thereof to take place at parity check 28 whereat the presence of absence of parity is determined and that information transmitted to error detection/correction block 30. The error detection/correction block 30 is connected to sync finder 27 through a line 45, with arrows 46 and 47 indicating the presence of sync error or loss and/or bad parity in the backing track. A signal indicating a sync error or loss in the main track is shown entering through line 45, and a parity check error in the main track data shown entering through line 48. In a chart at the bottom left hand portion of FIG. 5, a first left hand column indicates a bad match between main track (channel 1) and backup track (BU). The absence of an error is reflected therein by a zero, with the presence of an error shown as a 1. A corrective action to be taken by the circuitry of the present invention is shown in a far right column. This chart and its functioning will be described in detail later herein.

Continuing across the flow diagram of FIG. 5, a comparator 49 is shown as receiving the first 8 bits of a 16 bit word from the main track bit stream, after sync and parity have been checked therein, and in the corresponding 8 bits from backup track, shown at arrow 50. Within the comparator 49 a determination is made, as indicated by arrow 51, as to whether there is a good match between the first 8 bits of the 16 bit word from the main track with the corresponding 8 bits from the backup track.

Continuing across the flow diagram of FIG. 5, the least significant bits of the 16 bit word are the last 8 bits thereof that are shown to continue through the comparator 49 and into a holding register 53 whether an error is indicated in the first 8 bits or not. Therefrom, the data travels into the 64 word FIFO memory 32. Wherefrom, as shown in FIG. 1(a), the least significant portion of the data word progresses for pickup on either the first or second channel.

Should it be determined at the error correction/detection circuitry 30 that there is a mismatch, sync or parity error, a signal so indicating is passed to the multiplexor 52 through line 54 wherein a choice is made between the 8 bits from the primary or backup tracks as to which data is most likely correct for passage therethrough into the holding register 53. The logic involved in this determination will be explained later herein with respect to the chart in FIG. 5. It should, however, be noted that, if it is determined that neither data can be relied upon, as when a hold signal is passed through line 54 to the holding register 53, that instruction will cause an integration or averaging between good data on either side of that questionable data. Integrated or average data is then passed, as has been explained hereinbefore with respect to FIG. 1(a). Such command signal, as has been mentioned above with respect to the multiplexor, goes through line 54 with a timing signal, shown as strobe 55, passing from the error detection/correction logic 30 to synchronize the output from the holding register 53.

The logic involved in the error detection/correction outlined hereinabove is shown best in the chart at the lower left hand portion of FIG. 5. Therein the first line thereof shows no errors detected and therefore no correction procedureis undertaken with the main track data progressing, as described, through to the 64 word FIFO memory 32. Should there be a bad sync or bad parity reflected on the backup channel, as shown at line 2, then the same procedure would occur, the data on the main track being passed therethrough. However, as in line 3 of the chart, where a sync or parity loss is indicated in the main track data, then there would be a switching to the backup track information, with the appropriate bits thereon passed to the 64 word FIFO memory 32 substituting for the first 8 bits of the main track data. Where, however, as in line 4 of the chart, there are sync and parity errors indicated at both the main and backup tracks, then a hold signal is generated calling for integration or averaging between good data across the data where the error was sensed.

Where, as in line 5, there is a mismatch and no parity or sync errors detected, the same hold signal is given to command the same integration or averaging. Where, however, as on line 6 of the chart, there is indicated a mismatch with a sync error or bad parity in the backup track, then the most likely correct data is that on the main track and therefore that main track data is passed for further processing. Similarly, where there is indicated a mismatch with a sync or parity error on the main track, this condition would indicate that the backup track data is correct, and the multi-plexor 52 would be switched appropriately to substitute that backup track data for the main track data. Whereas, as in line 8, there is shown a mismatch with sync or parity errors on both the main and backup tracks, a determination cannot be made as to which rack, if either, is correct and therefore a hold signal is given calling for an integration or averaging order between good data.

In summary, the error detection/correction logic outlined hereinabove involves a checking of each data word on each main and backup track for a proper arrangement of synchronization bits and one parity bit therewith. The invention further provides for a check for a match of backup and appropriate main track data, that appropriate data being determined to be the first 8 bits of a 16 bit data word, with that comparison being made at a comparator 49 of FIG. 5. The checking for match and for proper sync and parity coding is made to determine which information on the main and backup tracks is most likely correct should differences exist therebetween. Obviously, as the backup track records most significant data from both the two main tracks, then a parity or sync error in the backup track information would be reflected as a backup track error for each main track. As outlined hereinabove, the present invention, when an error in one or both main and backup track data is detected, provides for selecting the most likely correct data and, in the event such determination cannot be made, provides for an integration or averaging between good data.

As a further explanation of certain elements and operations of the preferred two channel digital tape recorder, it should be noted that the aforementioned record side clock 13 is preferably a crystal oscillator. Such clock 13 puts out pulses happening at each bit period rate, which bit period rate preferably is approximately 37,500 words per second times each 20 bits per word. Clock 13 generates a signal that is known as track and hold, which signal, or course, controls the track and hold 16a and 16b of the present invention. In operation, therefore, the track and hold circuit will either hold the sample value that is being looked at, or track the analog value up to the next sample point. At the time the sample and hold switches into a hold mode, when the analog to digital converter is operated, that 20 bit data word is shifted out of the transmit logic.

On the playback side of the recorder 10, the bit stream coming from the tape 21 travels into a synchronizer which restandardizes the wave form and converts it into a logic wave form of zeros and ones and then passes it into the 64 word FIFO memory 32a and 32b wherein anyproblems of wow and flutter effects introduced from the tape mechanism are removed. Clocks 13 and 37 control the synchronization of data, the clock period being the same as a bit period that comes off the tape and so the clock will also have wow and flutter. Such wow and flutter are compensated for in that, everytime the sync finder locates an appropriate 20 bits of a data word in the right location, it will put out a pulse called the sync registration to require the data to be written in the 64 word FIFO memory 32. A request is then generated by the crystal oscillator on the playback side of recorder 10, identified as clock 37, whereby the clock 37 pulls the data words out of the 64 word FIFO memory 32, shown in FIG. 5, at the defined crystal oscillator rate. Each word then passes therefrom into the 16 bit digital to analog converter 38a. Thereafter, each word passes through the low-pass filter 39, as shown in FIG. 1(a), that is provided to smooth out the wave forms of the signal passed through the 16 bit D/A converter 38a.

Outlined hereinabove is the preferred circuitry arrangement for first conversion of an analog signal to digital and recording that data on a tape medium, and for lifting of that data off from that tape medium and converting from digital back to analog for playback. While an audio signal has been referred to herein, it should be obvious that any analog signal can to be processed as called for herein. It should also be noted that individual electrical components and the recording techniques employed by the present invention are well known in the art. However, the present invention provides for a novel and unique arrangement of such components to provide the logic circuitry required for performing the signal handling and error detection/correction functions described hereinabove. Certain circuitry is, however, unique to the present invention and is, therefore, claimed herein. The present invention should be understood to involve both apparatus and a method for its used that are believed by the inventor to be unique to the art and a significant improvement over prior digital recorders and error detection/correction methods.

Although a preferred embodiment of my invention in an apparatus for digitally recording of information and an error limiting, correction/detection method for use therewith have been shown and described herein, this disclosure is to be understood to be made by way of example and that variations are possible without departing from the subject matter and coming within the scope of the following claims, which claims I regard as my invention.

I claim:

1. A recorder apparatus for recording of an analog signal in digital form for storage and playback comprising,
   main flows each arranged to receive a multiple channel input;
   means for providing a digital representation of an analog signal;
   clocked record control circuitry means for controlling said means for providing a digital representation of an analog signal;
   a backup flow arranged to receive most significant portions of each data word each said main flow;
   means for adding synchronization and parity coding to each data word on each said main and backup flow;
   means for recording said main and backup flow data on a permanent media;
   means for reading said data from said permanent media;
   bit synchronizer circuitry means for determining bit intervals in each data word on each data word on each said flow passing that data and generating a clock signal therewith;
   synchronizer code finding means receiving clock pulsing from said bit synchronizer circuitry means for locating the synchronizer coding in each data word on each flow and passing appropriate signals when such code is present and when it is absent in each data word;
   parity checking circuitry means for locating a parity bit in each data word on each flow and passing appropriate signals when parity coding is present and when it is absent;
   comparator selector circuitry means for comparing the most significant data on said main flow against the data on said backup flow reflective thereof to determine if a match exists and for passing appropriate signals when a match exists and when said data does not match;
   error detector and corrector circuitry means connecting to said synchronizer code finding means, said parity checking circuitry means and said comparator selector circuitry means for determining whether there is an error present in main and backup flow data and selecting which information is most likely correct for passage from said comparator selector circuitry means;
   data word memory circuitry means receiving said data from said comparator selector circuitry means and clock signals for synchronizing the main flow information output to a playback head;
   a means for producing clock signals connecting to said data word memory circuitry means; and
   means for delivery of an analog signal from said digital representation.

2. A recorder apparatus as recited in claim 1, wherein the means for providing a digital representation of an analog signal consist of,
   track and hold circuitry means in each said main flow for holding information therein until triggered to pass that information and providing an interval between information;
   analog to digital conversion circuitry means in each said main flow wherein each piece of analog information is converted to a binary number data word, said circuitry clocked to pass said data word in said main flow and select a more significant portion of said data word and passes it to a backup flow; and
   the means for delivery of an analog signal from said digital representation consists of,
   digital to analog conversion circuitry means receiving information from the data word memory circuitry means for converting that data word to an analog form and passing that analog signal therefrom.

3. A recorder apparatus as recited in claim 1, further including,
   means for rearranging from parallel to serial each data word prior to its recording onto the permanent medium; and
   serial to parallel converter circuitry means for rearranging each data word lifted from said permanent media from serial back to parallel.

4. A recorder apparatus as recited in claim 1, further including,
   low-pass filter circuitry means in each said main track for removing all frequencies above a Nyquist frequency.

5. A recorder apparatus as recited in claim 1, further including,
   a servo control circuitry means for synchronizing tape speed to the data word memory circuitry means output.

6. A recorder apparatus as recited in claim 1, wherein, the means for providing a digital representation of an analog signal contains circuitry for converting the analog signal to a sixteen bit data word and said circuitry selects the first eight bits of each data word as the most significant portion thereof.

7. A recorder apparatus as recited in claim 6 wherein, the parity coding is a single bit; and the synchronization coding are three bits, two stop bits arranged at the start of the data word and one start bit at the end thereof.

8. A recorder apparatus as recited in claim 1, wherein the data word memory circuitry means includes, circuitry for receiving and passing therein data words on a first-in-first-out basis.

9. A recorder apparatus as recited in claim 8 wherein, the data word circuitry means is capable of containing a plurality of data words.

10. A recorder apparatus as recited in claim 1, further including, inverter circuitry means arranged in said main flow for inverting the voltage value of every other bit in a data word prior to recording it on the permanent media, and for reinverting said inverted bits prior to their passage to the means for delivery of an analog signal from said digital representation.

11. A method for providing error detection and correction of digital information recorded on a recording media including the steps of, receiving an analog input on main flows of a digital recording apparatus;

providing a digital representation of that analog input;

selecting most significant portions of each main flow data word for rerecording onto a backup flow;

encoding into each data word on each main and backup flow parity and synchronization coding;

recording said main and backup flow information onto a recording media;

checking appropriately the parity and synchronization coding in each data word on each flow coming off from the recording media;

comparing, for match, the most significant portion of a data word on a main flow with the appropriate portion of that data word on the backup flow;

determining the most likely correct information on main and backup flows from the checking of the parity and synchronization coding of each data word thereon and from a comparison of the most significant portions of each data word on the main and backup flows and passing that most likely correct data word for delivery of an analog signal from the digital representation and conversion of that analog signal to an output signal.

12. A method as recited in claim 11, further including the step of, selecting, as the most significant portion of each main flow data word, the first half thereof and recording each said half data word from both main flows as a single data word on a backup flow.

13. A method as recited in claim 12 wherein, the data word is made up of sixteen bits with the first half thereof being the first eight bits.

14. A method as recited in claim 11, further including the step of, averaging between good data words on either side of an unreliable data word where a selection of most likely correct main and backup flow information cannot be made.

15. A method as recited in claim 11, further including the steps of, inverting every other bit in each data word on main and backup flows prior to recording same on the recording media; and reinverting said every other bit in each data word prior to said data words being delivered as an analog signal.

* * * * *